United States Patent [19]
Hutschenreuter et al.

[11] Patent Number: 4,764,031
[45] Date of Patent: Aug. 16, 1988

[54] HOLLOW ROD COMPRISED OF A SHIRRED TUBULAR CASING AND CLOSURE ELEMENT

[75] Inventors: Elfriede Hutschenreuter, Bad Schwalbach; Max Bytzek, Wiesbaden; Klaus Andrae, Zornheim; Alois Weinheimer, Alzey, all of Fed. Rep. of Germany

[73] Assignee: Hoechst Aktiengesellschaft, Fed. Rep. of Germany

[21] Appl. No.: 8,115

[22] Filed: Jan. 23, 1987

Related U.S. Application Data

[63] Continuation of Ser. No. 881,488, Jul. 1, 1986, abandoned, which is a continuation of Ser. No. 567,185, Dec. 30, 1983, abandoned.

[30] Foreign Application Priority Data

Dec. 31, 1982 [DE] Fed. Rep. of Germany ........ 3248761

[51] Int. Cl.⁴ .................... A22C 13/02; B65D 30/20
[52] U.S. Cl. .................................. 383/120; 206/802; 426/135
[58] Field of Search .............. 206/802; 138/118.1; 383/120; 426/135, 138, 140

[56] References Cited

U.S. PATENT DOCUMENTS

| | | | |
|---|---|---|---|
| 3,274,005 | 9/1966 | Alsys | 99/176 |
| 3,383,222 | 5/1968 | Alsys et al. | 99/176 |
| 3,892,869 | 7/1975 | Sheridan et al. | 426/138 |
| 3,971,301 | 7/1976 | Becker et al. | 93/84 TW |
| 4,075,938 | 2/1978 | Martinek | 9.3/84 TW |
| 4,428,402 | 1/1984 | Kubo et al. | 138/118.1 |

FOREIGN PATENT DOCUMENTS

| | | |
|---|---|---|
| 1153994 | 9/1983 | Canada . |
| 2165191 | 7/1973 | Fed. Rep. of Germany . |
| 0025479 | 6/1980 | Fed. Rep. of Germany . |
| 2070909 | 2/1981 | United Kingdom . |

*Primary Examiner*—Stephen P. Garbe
*Attorney, Agent, or Firm*—Foley & Lardner, Schwartz, Jeffery, Schwaab, Mack, Blumenthal & Evans

[57] ABSTRACT

Disclosed is a cylindrically-shaped hollow rod which is closed at one end, comprising a shirred tubular casing, and an integral, essentially cylindrically-shaped, plug-type closure element which is coaxially arranged in the cavity of the hollow rod and which comprises a de-shirred tubing portion and an irregularly folded, compressed tubing portion, wherein a first one of the tubing portions is adjacent to the inside wall of the hollow rod, and the second tubing portion is surrounded by the first tubing portion, wherein one end of the first tubing portion, which points in the direction of the open end of the hollow rod, is bent back at an angle of 180° and integrally changes into the second portion, and wherein the other end of the first tubing portion integrally changes into the hollow rod. Also disclosed is a process for producing the hollow rod having the end closure according to the invention.

4 Claims, 6 Drawing Sheets

HOLLOW ROD COMPRISED OF A SHIRRED TUBULAR CASING AND CLOSURE ELEMENT

This application is a continuation of application Ser. No. 881,488, filed July 1, 1986, now abandoned, which is a continuation of application Ser. No. 567,185, filed Dec. 30, 1983, now abandoned.

BACKGROUND OF THE INVENTION

The present invention relates to a cylindrically-shaped hollow rod, also called concertina, which is closed at one end and is comprised of a shirred tubular casing. The hollow rod includes in its cavity, i.e., in the interior of the bore of the concertina, an integral plug-type closure element which is adjacent to the inside wall of the hollow rod and comprised of an irregularly folded, compressed tubing section. The invention relates also to a process and device for production of the tubular casing. The closure element is also called an end closure.

Hollow rods of this type, which are, for example, made of cellulose hydrate, are used for producing sausages. For filling the cavity of the hollow rod with the sausage meat, the stuffing horn of the sausage stuffing machine is first inserted into the cavity of the hollow rod up to the end of the rod which is closed by the closure element, then the sausage meat is pressed through the stuffing horn into the cavity of the hollow rod. By means of the pressure exerted by the sausage meat, the hollow rod is continuously deshirred. The sausage strand which is thereby formed is divided into a plurality of individual sausages by tying off or twisting.

The first end of the first sausage carries the closure element. This sausage is thrown away, for it usually does not contain a sufficient quantity of sausage meat. For reasons of economy, it is, however, desirable that the sausage meat contained in this first sausage casing can be recovered; therefore, the end closure must be designed such that it can be opened manually without difficulaty, by stripping off the sausage meat. On the other hand, no unintentional opening of the end closure must occur due to the sudden pressure exerted by the sausage meat when the stuffing process starts.

Hollow rods of the type mentioned at the outset are, for example, known from U.S. Pat. No. 3,383,222. In accordance with the teaching of this publication, an end portion of the hollow rod is pulled off perpendicularly to the longitudinal axis by means of a hook-like tool. By a first plunger, the portion of the casing which covers the aperture of the hollow rod is pressed into the interior of the concertina, whereby an adjacent portion of the casing is deshirred and also pressed into the cavity of the hollow rod. Then the first plunger is removed. Subsequently, the portion of the casing, which is now located in the interior of the hollow rod, is pressed against a stop member brought into contact with the end of the hollow rod to be closed, by a second plunger introduced into the opposite end of the hollow rod, and is thus compressed.

This closure element is hardly capable of withstanding the high pressure applied in modern sausage stuffing equipment. Furthermore, it is of an undefined shape, which often leads to non-reproducible results. There is also the risk of unintenionally damaging the inner side of the hollow rod, when the two plungers are introduced. Moreover, the process is relatively expensive because of the numerous individual process steps and the various applicances required.

SUMMARY OF THE INVENTION

It is therefore an object of the present invention to provide a hollow rod with a closure element, of the type described initially, wherein the closure element is able to fulfill its closing function even at high pressures.

Another object of the invention resides in providing such a hollow rod with closure wherein it is possible to open the closure element manually without difficulty by stripping off the sausage meat, in order to ensure a problem-free recovery of the sausage meat contained in the respective sausage.

It is furthermore an object of the invention to provide a closure element which can be produced in an expedient way, using little casing material, in few process steps and without much mechanical expense.

Still another object of the invention resides in providing a device for producing the hollow rods which are provided with an end closure according to the invention.

In accomplishing the foregoing objects, there has been provided in accordance with one aspect of the present invention a cylindrically-shaped hollow rod which is closed at one end, comprising a shirred tubular casing, and an integral, essentially cylindrically-shaped, plug-type closure element which is coaxially arranged in the cavity of the hollow rod and which comprises a deshirred tubing portion and an irregularly folded, compressed tubing portion, wherein a first one of the tubing portions is adjacent to the inside wall of the hollow rod, and the second tubing portion is surrounded by the first tubing portion, wherein one end of the first tubing portion, which points in the direction of the open end of the hollow rod, is bend back at an angle of 180° and integrally changes into the second portion, and wherein the other end of the first tubing portion integrally changes into the hollow rod.

In accordance with another aspect of the present invention, there has been provided a process for producing the hollow rod defined above, comprising the steps of withdrawing a tubing portion from the end of the hollow rod to be closed, in the direction of the longitudinal axis, whereby the withdrawn portion is deshirred; and compressing the deshirred tubing portion in the direction opposite to the direction of step (a), to produce an irregularly folded tubing portion having an essentially cylindrical shape and a diameter which essentially corresponds to the diameter of the cavity of the hollow rod. In one embodiment, the process further comprises the step of introducing the irregularly folded tubing portion into the cavity of the hollow rod, whereby a second tubing portion from the end of the hollow rod is simultaneously introduced into the cavity of the hollow rod while being deshirred and inverted, this second deshirred tubing portion being adjacent to the inside wall of the hollow rod and at the same time surrounding the irregularly folded tubing portion. In another embodiment, the first tubing portion withdrawn from the end of the hollow rod and deshirred is simultaneously inverted and introduced into the cavity of the hollow rod, and in the second step the deshirred tubing portion is gripped by its end, which is located in the cavity of the hollow rod, and is inverted again and drawn in the direction of the end of the hollow rod to be closed, through the cavity of the deshirred tubing portion, whereby the deshirred tubing portion extending from the end of the hollow rod to be closed into the cavity of the hollow rod is simultaneously compressed in the direction of the end of the hollow rod to be closed, thereby producing an irregularly folded tubing portion having an essentially cylindrical, plug-type shape which is adjacent to the inside wall of the hollow rod and surrounds a still deshirred tubing portion comprised of the drawn-back, deshirred tubing portion.

According to still another aspect of the invention, there has been provided a device for carrying out the process as defined above, comprising means for drawing off and simultaneously deshirring a tubing portion from the end to be closed of a hollow rod, this drawing-off means including a gripping element which can be moved in the direction of the longitudinal axis of the hollow rod; and means for compressing the deshirred tubing portion along the axis in the direction opposite to the drawing-off direction.

Further objects, features and advantages of the invention will become apparent from the detailed description of preferred embodiments which follows, when considered with the attached figures of drawings.

DETAILED DESCRIPTION OF PREFERRED EMBODIMENTS

The double-walled embodiment of the closure element which is composed of two tubing portions, together with the special folding of one of the tubing portions, assures a problem-free and smooth, i.e., material-saving, unfolding of the closure when the sausage meat is stripped out of the first sausage.

The whole circumferential surface of the closure element essentially adjoins the inside wall of the hollow rod, so that it cannot slide about. There are no substantial gaps between the outer circumferential surface of the closure element and the inside wall of the hollow rod, so that at most some air, but no sausage meat can penetrate between the closure element and the inside wall of the hollow rod. The folded portion of the tubing effects a firm fit of the closure element in the interior of the hollow rod.

The closure element of this invention is comprised of an essentially cylindrically-shaped plug, which is arranged coaxially in the cavity of the hollow rod and closes one end of the cavity of the hollow rod which has a substantially circular cross-section. The plug comprises two tubing portions which are made of one single tubing section. This tubing section is integrally linked with the hollow rod of densely shirred tubular casing. At the beginning of the formation of the end closure, it is pulled off from the end of the hollow rod to be closed and thereby deshirred.

The tubing section is built up of two tubing portions. One of these portions remains in the deshirred state, i.e., it is practically free from shirring folds. The other tubing portion is converted from the deshirred state into a new, folded structure by compressing it in the direction of its longitudinal axis. This folded structure is relatively loose, i.e., irregular. The folds in this folded structure are not so dense as the folds of the hollow rod which is very densely shirred for reasons of stability. The folded tubing portion forms the major part of the plug and practically fills the whole circular cross-section of the cavity of the hollow rod.

The two tubing portions extend in the cavity of the hollow rod, in a direction parallel to the longitudinal axis of the hollow rod. Thus, they differ essentially from quite a number of known types of end closures, wherein the tubing sections (which are envisaged for closing one end of the hollow rods and are arranged in the cavity of the latter) extend perpendicularly to the longitudinal axis of the hollow rod.

The two tubing portions are arranged coaxially, one tubing portion surrounding the other one. It is possible both for the folded and for the deshirred tubing portion to form the inner, central tubing portion and to be surrounded by the other, outer tubing portion. The outer tubing portion adjoins the inside wall of the hollow rod.

The closure element of this invention can, therefore, be executed in two different ways.

In a first embodiment, the closure element is designed such that the tubing portion adjoining the inside wall of the hollow rod is folded by compression, and the other tubing portion, which is arranged coaxially in the first tubing portion, is in the deshirred state. The first, irregularly folded tubing portion is in direct contact with the inside wall of the hollow rod, whereas the other tubing portion is arranged at a distance from the inside wall of the hollow rod, about the center of the circular cross-section of the hollow rod. In this embodiment, the outer, folded tubing portion surrounds the deshirred tubing portion over the entire length of the latter, and its outer surface closely adjoins the inside wall of the hollow rod.

At the end of the closure element pointing in the direction of the non-closed end of the hollow rod, the deshirred, centrally arranged tubing portion is bent in the direction of the inside wall of the hollow rod and integrally changes into the folded tubing portion, in the direction of the closed end of the hollow rod. At the end to be closed of the hollow rod, the folded tubing portion integrally turns into the hollow rod.

In this embodiment, the closure plug is particularly well anchored in the interior of the hollow rod. The folds obtained by lengthwise compressing the tubing portion which is immediately adjacent to the inside wall of the hollow rod ensure an especially tight fit of the plug to the folded structure of the inside wall of the hollow rod. The plug can be removed in a simple and material-saving way, for it is not necessary to withdraw the plug as whole. Instead only the folds due to the lengthwise compression need to be unfolded again for this purpose.

In a preferred, second embodiment, the closure element is designed such that the deshirred portion is adjacent to the inside wall of the hollow rod, whereas the other tubing portion, which in this embodiment is coaxially located within the outer tubing portion, is folded by lengthwise compression. In the second embodiment, the deshirred, outer tubing portion surrounds the folded, inner tubing portion over the entire length of the latter, and its outer surface immediately adjoins the inside wall of the hollow rod. There is no direct contact possible between the folded tubing portion and the shirred structure of the hollow rod, since the deshirred tubing portion is located between them.

At the end of the closure element which points in the direction of the non-closed end of the hollow rod, the inner, folded tubing portion is bent in the direction of the inside wall of the hollow rod and then integrally changes into the deshirred, outer tubing portion. At the end to be closed of the hollow rod, the deshirred outer tubing portion integrally turns into the hollow rod. This second embodiment is preferred, because the objects of the invention are accomplished more readily when it is used.

In both embodiments, the open end of the tubing section forming the end closure is located at the end of the hollow rod which is to be closed, and is arranged centrally in the circular cross-section of the cavity of the hollow rod. The open end of the tubing section thus is a part of the folded or of the deshirred tubing portion, depending on which of the two portions is located centrally in the cavity of the hollow rod. This open end can optionally be laid flat or folded perpendicularly to the axis of the concertina or twisted axially through an angle of, for example, between 90° and 270° C.

In both embodiments, the two parts of the end closure have about the same length, although the folded tubing portion includes, of course, a longer piece of tubular casing than the deshirred portion. The centrally arranged tubing portion can be slightly shorter than the external tubing portion which is adjacent to the inside wall of the hollow rod.

In its preferred embodiment, the closure element is located at the hollow conical end of the hollow rod. The hollow conical end is that end of the hollow rod which is first formed when the tubular casing is shirred to obtain the hollow rod. Since, with the shirring processes which are customary today, the surfaces of the shirring folds are no longer arranged perpendicularly to the longitudinal axis of the hollow rod, but rather at an acute angle with respect to it, the hollow rod has conical surfaces at its end. Therefore, the shirring fold which is formed first, at the hollow conical end of the hollow rod, has a conical surface directed into the cavity of the hollow rod, seen in the direction of the longitudinal axis, which practically acts as a funnel when the folded and/or the deshirred tubing portions are pressed into the hollow stick and thus facilitates the pushing-in of the tubing portions.

It is a common feature of the processes for the production of the end closure of the hollow rod that, first of all, a section of the tubular casing is drawn off from the end to be closed of the hollow stick and is thereby deshirred. Drawing-off is effected in the direction of the longitudinal axis of the hollow rod, either away from the rod or into the cavity of the hollow rod, whereby in the latter case the drawn-off tubing section is simultaneously inverted or turned inside-out. The two process variants claimed herein result from these two drawing-off variants.

In an alternative process, the deshirred tubing section, which has been introduced into the interior of the hollow rod, is compressed in the direction of the end of the hollow rod which is to be closed. For this purpose, the open end of the tubing section is gripped, and the tubing section is moved in the direction of the end of the hollow rod to be closed while being inverted again. In order to be able to compress the deshirred tubing section in the interior of the hollow rod, in the direction of the end of the hollow rod to be closed, it is recommended to provide a counterforce, such as, for example, an abutment or a stop member which acts upon this tubing section near the end of the hollow rod to be closed.

By this compression, the outer tubing portion of the closure element, which is pressed against the inside wall of the hollow rod, is irregularly folded or curled.

By pulling out the open end of the tubing section through the cavity of the outer, curled tubing portion, the central, deshirred tubing portion of the closure element is formed.

In the other, preferred process variant, in which a portion of the tubing is drawn away from the end of the hollow rod to be closed and thereby deshirred, the deshirred tubing portion is compressed outside the hollow rod, in the direction of the longitudinal axis and in a motion directed toward the end of the hollow rod to be closed, whereby a folded structure is obtained. The front surface of the hollow rod, which extends from the outer circumference of the hollow rod to the edge of its cavity, may thereby serve as an abutment for the compression process. It is also possible to provide in the area of the front surface of the hollow rod a particular element, for example, a ring-shaped body, as an abutment for this compression process.

In a preferred embodiment of this process variant, the tubing portion is supported from the outside while being drawn off from the end of the hollow rod, particularly during the subsequent compression in the direction of the longitudinal axis, for example, by a pipe-shaped body having an internal diameter which corresponds to the external diameter of the plug formed by compression. Therefore, this internal diameter must not be substantially larger than the internal diameter of the hollow rod, in order to make sure that the diameter of the plug does not become too large, so that it can be pushed into the cavity of the hollow rod without too much effort in the next process step.

While the folded tubing portion is being inserted into the cavity of the hollow rod, another portion of the shirred tubular casing is deshirred at the end of the hollow rod to be closed, in the direction of the cavity of the hollow rod, and simultaneously inverted. This deshirred tubing portion is very tightly pressed between the irregularly folded central tubing portion obtained by compression in the direction of the longitudinal axis and the inside wall of the hollow rod.

In both process variants, the formation of the closure element itself may be followed by an additional shaping of the open end of the central tubing portion. In the simplest case, this end is just released after the formation of the closure element and then usually is present in a laid-flat form. It is, however, also possible to bend it perpendicularly to the longitudinal axis of the hollow rod and to fold it or to twist it about the longitudinal axis of the hollow rod, the twisting angle being, for example, between 90° and 270° C. The shape of the open end of the closure element can be arbitrarily chosen and has no essential influence on the effectiveness of the closure element itself.

It is another opbject of the present invention to provide a device for carrying out the process, by means of which there can be produced the hollow rod of this invention which is provided with an end closure.

The device is of a relatively simple constructional design and comprises, as its essential component part, a gripping element which can be shifted coaxially with and in the direction of the longitudinal axis of the hollow rod. By this movement of the gripping element, the hollow rod can be easily provided with the end closure which is made of casing material and is applied to one end of the hollow rod.

The gripping mechanism of the gripping element can be of any desired contruction. For example, it can grip the outside of a laid-flat piece of tubing at the end of the hollow rod by clamping, or it can hold the tubing by being spread against the inside of the end of the hollow rod and thus removed and deshir a section of the tubing material. In general, gripping is carried out by mechanical means, but it may also be performed by suction.

If the deshirred tubing portion is to be compressed outside the hollow rod, it is furthermore recommended to install a member which is suitable for externally supporting the deshirred tubing portion during the compression outside the hollow rod, and against which the deshirred tubing portion can rest while being compressed, such as, for example, a pipe- or sleeve-shaped member. The internal diameter of this cylindrically-shaped hollow member must be adapted to the internal diameter of the hollow rod. Above all, it has a supporting function during the shaping (outside the hollow rod) of the deshirred tubing portion into a plug. In accordance with the invention, the type of material of which this member is made is irrelevant, as long as it possesses a sufficient stability.

In the interior of this support member, the gripping element can be freely moved forwardly and backwardly along the longitudinal axis, this movement being, for example, effected by means of a guide rod which is, for example, made of metal and is sufficiently long to move the gripping element to any desired working position.

If the closure element is formed in accordance with the process variant in which one tubing portion is deshirred and immediately introduced into the cavity of the hollow rod, the tubing portion introduced into the cavity is advantageously internally supported by a member which expands this portion to a dimater which is sufficiently large to move the gripping element freely in the direction of the longitudinal axis within this tubing portion. This member thus forms a channel for the gripping element and is, for exmple, a pipe-shaped hollow cylinder.

For carrying out this process variant, a stop member is additionally located at the end to be closed of the hollow rod, which acts as an abutment when the tubing portion which is adjacent to the inside wall of the hollow rod is to be irregularly folded while the gripping element is being removed from the interior of the hollow rod. The end of the pipe-shaped hollow cylinder acting as a channel for the gripping element can, for example, form this stop member. The stop member can also be an independent unit which is introduced into the gap formed between the end of the hollow rod and the end of the pipe-shaped hollow cylinder when the casing material is deshirred, i.e., at the end of the hollow rod, or it can be movably installed on the circumferential surface of this pipe-shaped hollow cylinder.

Below, the invention is explained in greater detail by reference to the attached drawing FIGS. 1 to 7.

Figure 1:
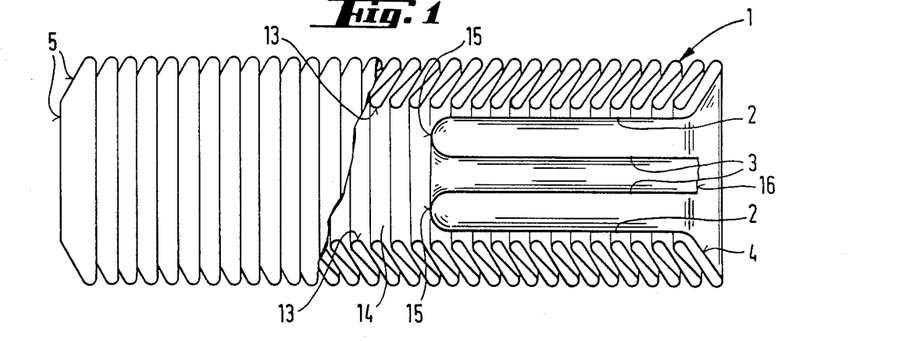
FIG. 1 is a diagrammatic side view and partial sectional view of a hollow rod.

In FIG. 1, the hollow rod 1 is provided with a closure element comprised of an outer tubing portion 2 and a central, inner tubing portion 3. The closure element is located at the hollow conical end 4 of the hollow rod 1. The end 4 has a conical front surface which is inclined in the direction of the cavity 14 of the hollow rod. The opposite end 5 of the hollow rod 1 is not closed. Reference numeral 13 denotes the inside wall of the hollow rod 1.

Figure 2:
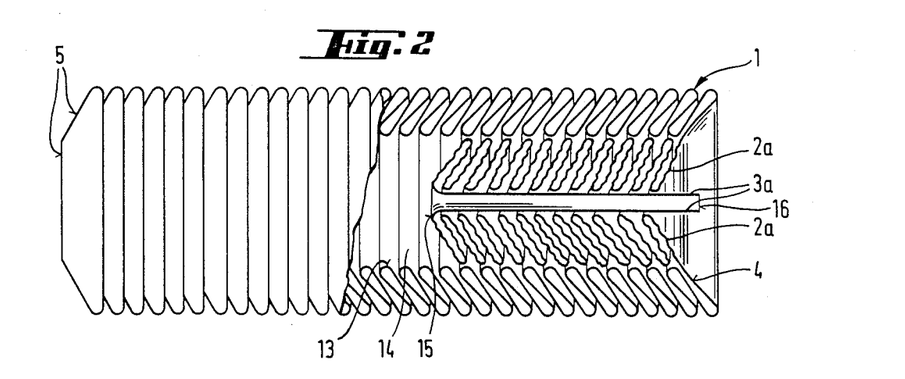
FIG. 2 is a side view and partial sectional view of an embodiment of the hollow rod, with a cut-open closure element.

In FIG. 2, the closure element in the cavity 14 of the hollow rod 1 comprises an irregularly folded tubing portion 2a which is adjacent to the inside wall 13 of the hollow rod 1. The other, deshirred tubing portion 3a is arranged coaxially in and surrounded by the tubing portion 2a. In the area 15, the central tubing portion 3a is bent in the direction of the inside wall 13 of the hollow rod 1 and turns into the tubing portion 2a extending in the direction of the end 4 of the hollow rod 1. At the opposite end, the tubing portion 2a integrally changes into the hollow rod 1. Open end 16 of the tubing section forms the end closure, which is located in the center of the cavity 14 of the hollow rod.

Figure 3:
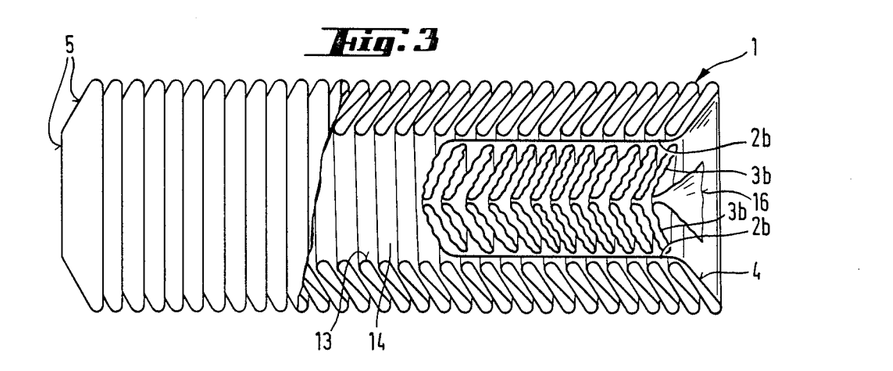
FIG. 3 is a side view and partial sectional view of a preferred embodiment of the hollow rod, with a cut-open closure element.

In FIG. 3, the outer, deshirred tubing portion 2b is adjacent to the inside wall 13 of the hollow rod 1 and surrounds the inner, irregularly folded tubing portion 3b.

Figures 4A, 4B, 4C, 4D:
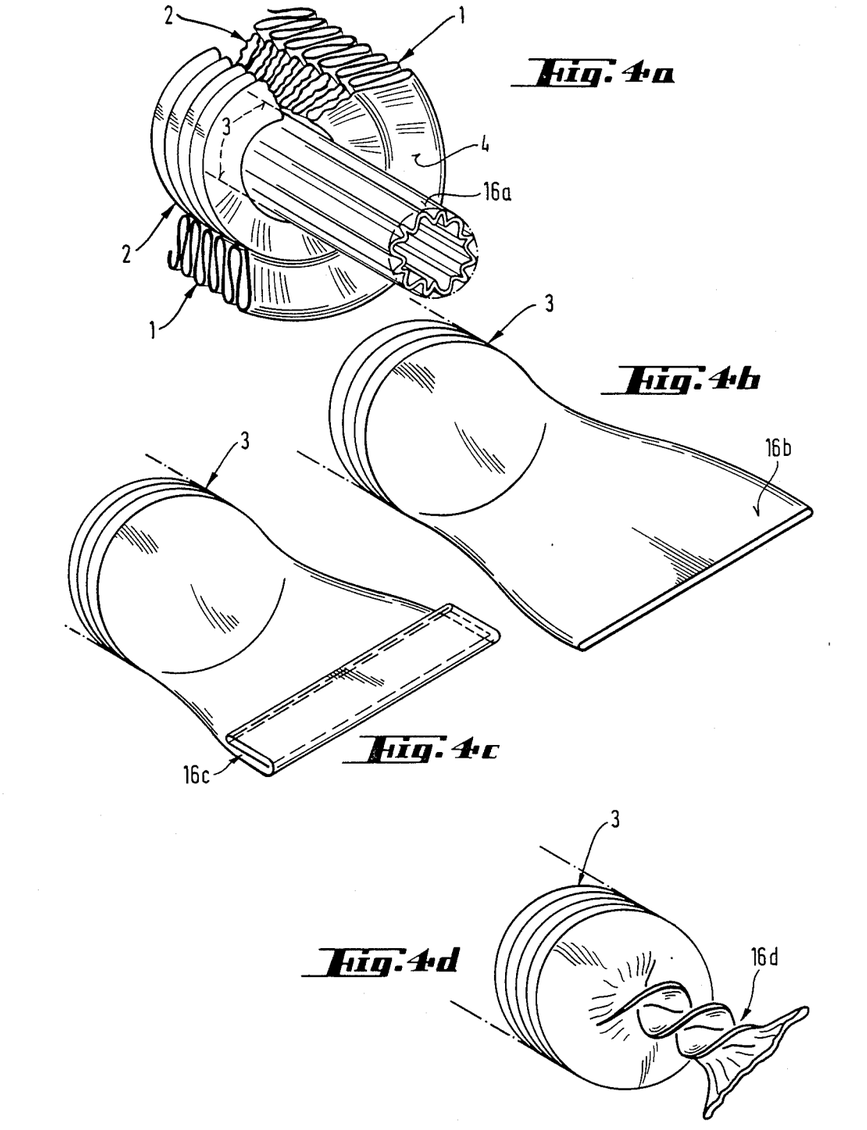
FIGS. 4a–4d show four different embodiments of the open end of the tubing section forming the end closure.

FIGS. 4a to 4d show different embodiments of the open end 16 of the inner tubing portion 3, the end 16a in FIG. 4a being round, the end 16b in FIG. 4b being laid-flat, the end 16c in FIG. 4c being folded, and the end 16d in FIG. 4d being twisted.

Figure 5A:
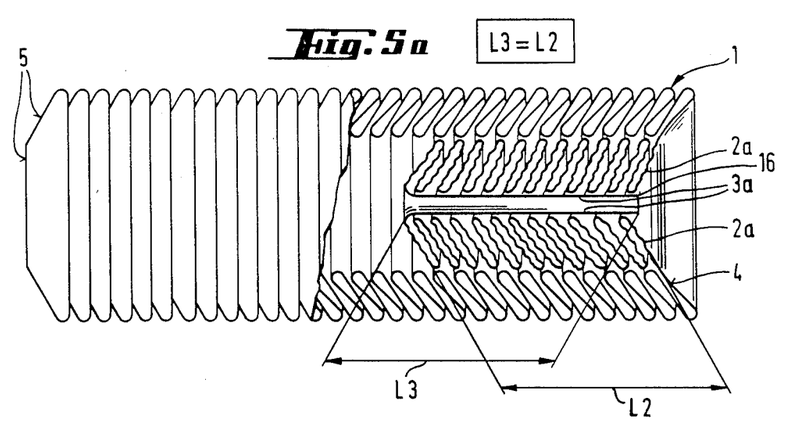
FIGS. 5a and 5c show two different embodiments of the hollow rod according to FIG. 2.
Figure 5B:
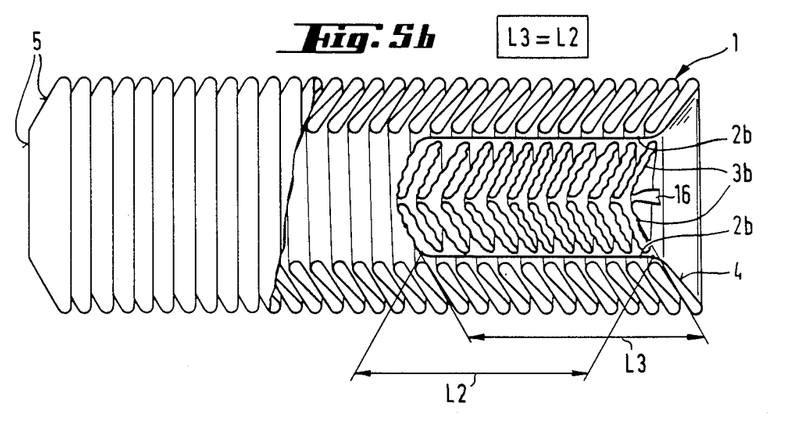
FIGS. 5b and 5d show two different embodiments of the hollow rod according to FIG. 3.
Figure 5C:
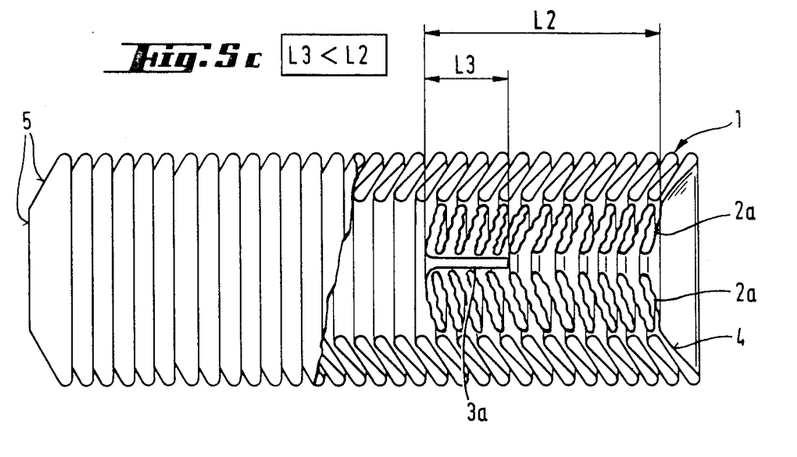
Figure 5D:
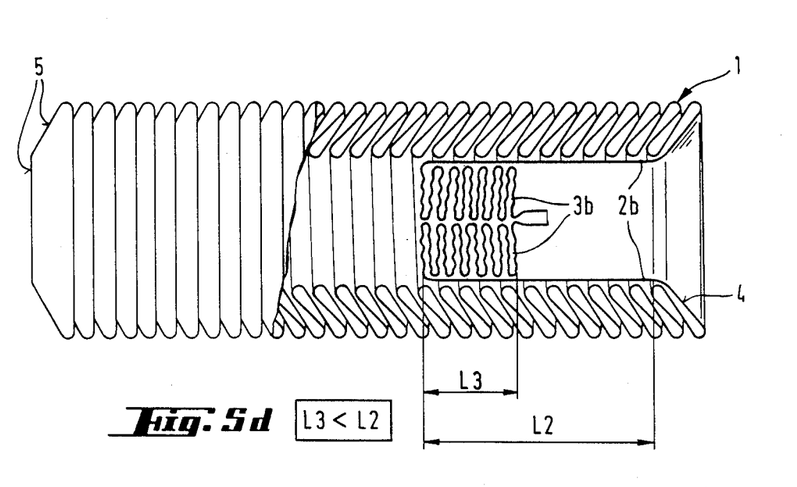

FIGS. 5a to 5d show different embodiments of the closure element. In FIG. 5a, the central tubing portion 3a is deshirred and has the same length (L 3) as the outer tubing portion 2a (L 2). In FIG. 5b, the central tubing portion 3b is folded and also has the same length (L 3) as the deshirred, outer tubing portion 2b (L 2). In FIG. 5c, the central tubing portion 3a is deshirred and shorter (L 3) than the outer, folded tubing portion 2a (L 2). In FIG. 5d, the central tubing portion 3b is folded and shorter (L 3) than the outer, deshirred tubing portion 2b (L 2). For reasons of clarity, the usual bearing and supporting elements and drive and control means are not shown in FIGS. 6a to 6e and 7a to 7f.

Figure 6A:
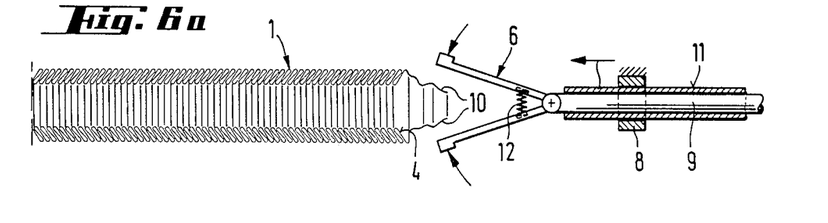
FIGS. 6a–6e diagrammatically show the process stages and device for producing the hollow rod according to FIG. 2.
Figure 6B:
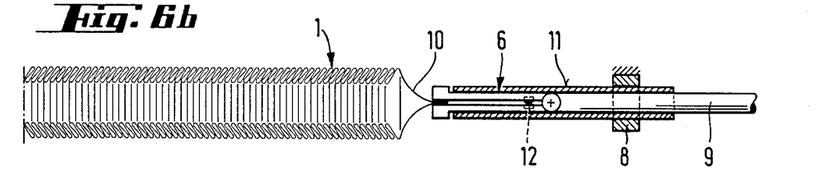
Figure 6C:
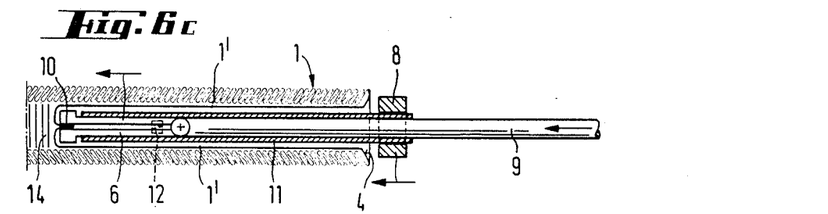
Figure 6D:
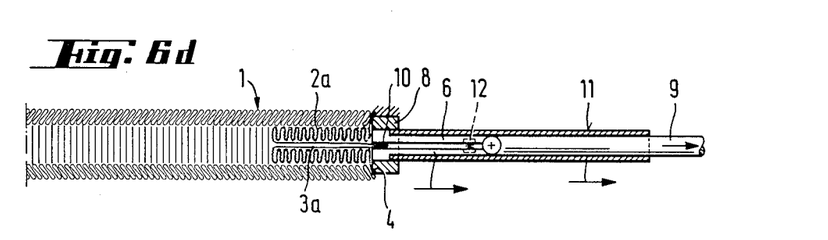
Figure 6E:
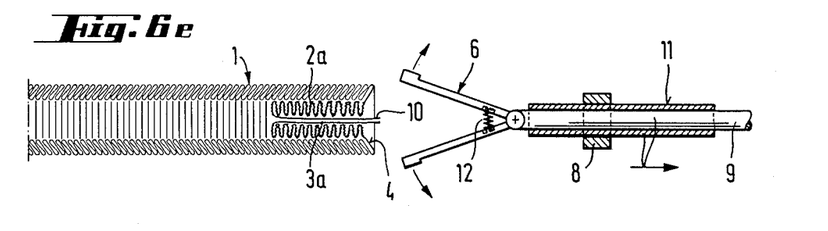

FIG. 6a shows the gripping element 6 which is kept open by the spring member 23, and which is positioned above the end piece 10 of the tubular casing, at the hollow conical end 4 of the hollow rod 1, and can be shifted along the longitudinal axis by means of the guide rod 9. The guide rod is moved within the hollow cylinder 11, which can also be shifted along the longitudinal axis. In FIG. 6b, the hollow cylinder 11 is shifted along the longitudinal axis in the direction of the hollow rod 1, whereby the gripping element 6 is caused to seize the tubular casing 10. In FIG. 6c, the gripping element 6, which holds the tubular casing 10, is moved into the cavity 14 of the hollow rod 1 by means of the guide rod 9 (arrow), whereby a portion of the shirred tubular casing 1', by which the hollow rod 1 is constituted, is deshirred. The hollow cylinder 11 is also introduced into the cavity 14 of the hollow rod 1. In FIG. 6d, the guide rod 9 moves the gripping element 6 along the longitudinal axis in the opposite direction, i.e., in the direction of the hollow conical end 4 of the hollow rod (arrow), whereby the deshirred tubing material 1' is pressed against the stop 8, which now rests in a firm position, and is folded so that a plug-shaped closure element is obtained. In this process stage, the folded, outer tubing portion 2a and the deshirred inner tubing portion 3a can be clearly distinguished. In FIG. 6e, the gripping element 6 is removed from the end of the deshirred, central tubing portion 3a and the outer tubing portion 2a has its final, folded form. Opening of the gripping element 6 can be effected automatically by the spring member 12 when the hollow cylinder 11 is pushed back from the gripping element 6.

Figure 7A:
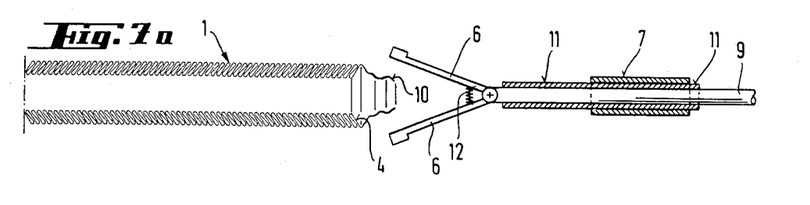
FIGS. 7a–7f diagrammatically show the process stages and device for producing the hollow rod according to FIG. 3.
Figure 7B:
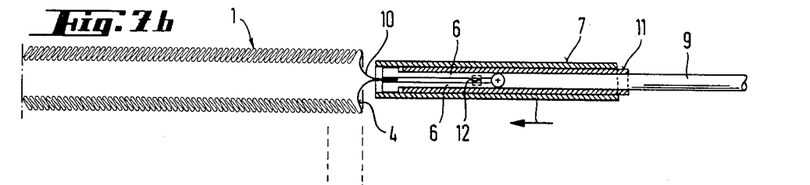
Figure 7C:
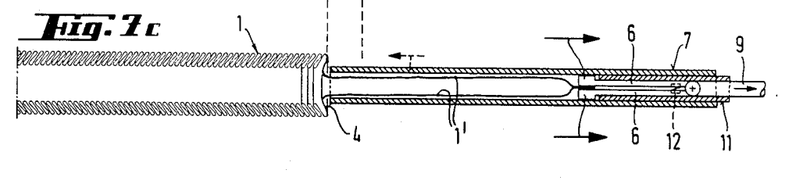
Figure 7D:
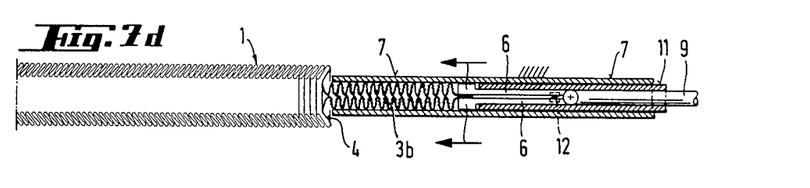

FIG. 7a shows the gripping element 6 which is kept open by the spring member 12 and engages the tubing from the outside, and which is positioned above the end piece 10 of the tubular casing at the hollow conical end 4 of the hollow rod 1 and can be shifted along the longitudinal axis by means of the guide rod 9. The guide rod 9 is moved in the interior of the hollow cylinder 11, which can also be shifted along the longitudinal axis. The functioning of the hollow cylindrical body 7 is explained in FIGS. 7c and 7d. In FIG. 7b, the tubular casing 10 is gripped by the gripping element 6. In FIG. 7c, by means of the guide rod 9, it is drawn into the hollow cylindrical body 7 which has been shifted to the end 4 of the hollow rod 1 (arrow in FIG. 7b), whereby the tubular casing 10 is further deshirred. The deshirred casing material has been given the reference numeral 1'. In FIG. 7d, the gripping element 6 has been moved in the opposite direction along the longitudinal axis, i.e., in the direction of the hollow conical end 4 of the hollow rod 1, by the guide rod 9 (arrow), whereby the deshirred casing material 1' has been compressed and irregularly folded in the hollow channel formed by the hollow cylindrical body 7.

Figure 7E:
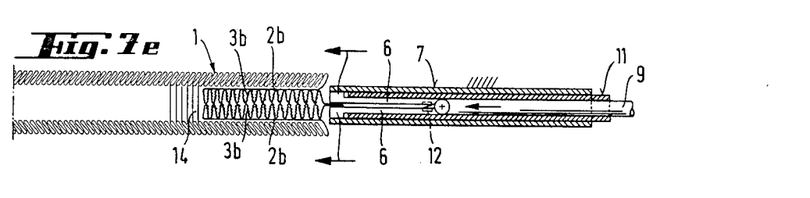
Figure 7F:
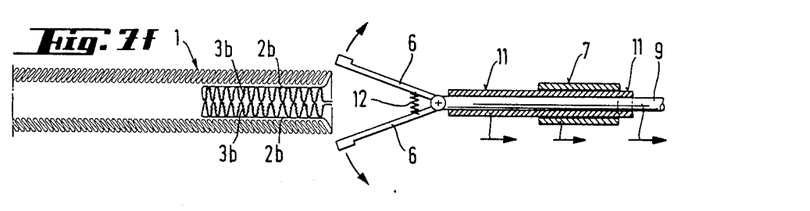

During the compression, the end 4 of the hollow rod 1 serves as a stop member. In FIG. 7e, the folded tubing portion 3b formed in the hollow cylindrical body 7 has been pushed in to the cavity 14 of the hollow rod 1 and now constitutes the central tubing portion 3b, and an outer tubing portion 2b is present in the deshirred state. In FIG. 7f, the end of the casing, which so far had een gripped by the gripping element 6, has been released by moving the hollow body 7 backwardly, and the complete plug-shaped closure element, comprised of the outer, deshirred tubing portion 2b and the inner, folded tubing portion 3b, is shown.

The particular advantage provided by the present invention resides in the fact that only movements in the direction of the longitudinal axis need be performed for the production of the closure element, which makes the closure element especially suitable for automatic production processes. The closure element can be applied to all usually employed hollow rods, in particular to hollow rods made of small-diameter sausage casings, such as are, e.g., used to produce skinless sausages, by means of automatic stuffing apparatus.

What is claimed is:

1. A cylindrically-shaped hollow rod which has a first end, a second end and an inside wall that defines a cavity, said hollow rod comprising:
    (A) a shirred tubular casing; and
    (B) an integral, essentially cylindrically-shaped, plug-type closure element which is coaxially arranged in said cavity near one of said first and second ends and which comprises a first outer tubing portion and a central second tubing portion, said first outer tubing portion being comprised of lengthwise-deshirred casing material which is lengthwise drawn off said shirred tubular casing and pressed against said inside wall of said hollow rod such that there are substantially no gaps between said first outer tubing portion and said inside wall, wherein (i) said first outer tubing portion integrally changes into said shirred tubular casing and integrally changes into and surrounds said second tubing portion and (ii) said second tubing portion is comprised of casing material which is lengthwise compressed into irregular folds within said first outer tubing portion, such that said lengthwise-compressed casing material is less densely folded than said shirred tubular casing, to form said plug-type closure element, which closure element has a cross section that substantially corresponds to the cross section that substantially corresponds to the cross section of said cavity of said hollow rod.

2. A hollow rod as claimed in claim 1, wherein at least one of said first and second ends of said hollow rod comprises a conical surface, said closure element being located at an end of said hollow rod where said conical surface is inclined into said cavity and toward the other end of said hollow rod.

3. A hollow rod as claimed in claim 1, wherein said first tubing portion and said second tubing portion are approximately equal in length.

4. A cylindrically-shaped hollow rod which has a first end, a second end and an inside wall that defines a cavity, said hollow rod comprising:
    (A) a shirred tubular casing; and
    (B) an integral, essentially cylindrically-shaped, plug-type closure element which is coaxially arranged in said cavity near one of said first and second ends and which comprises a first outer tubing portion and a central second tubing portion, said first outer tubing portion being comprised of lengthwise-deshirred casing material which is lengthwise drawn off said shirred tubular casing and pressed against said inside wall of said hollow rod such that there are substantially no gaps between said first outer tubing portion and said inside wall, wherein (i) said first outer tubing portion integrally changes into said shirred tubular casing and integrally changes into and surrounds said second tubing portion, (ii) said second tubing portion is comprised of casing material which is lengthwise compressed into irregular folds within said deshirred first outer tubing portion, such that said lengthwise-compressed casing material is less densely folded than said shirred tubular casing, to form said plug-type closure element, which closure elemwnt has a cross section that substantially corresponds to the cross section of said cavity of said hollow rod, and (iii) said second tubing portion is shorter than said first outer tubing portion.

* * * * *